United States Patent
Reichenbach et al.

(10) Patent No.: US 8,245,838 B2
(45) Date of Patent: Aug. 21, 2012

(54) APPARATUS AND METHOD FOR THE RECORDING OF IMAGES OF OBJECTS MOVED ON A CONVEYOR DEVICE

(75) Inventors: Jürgen Reichenbach, Emmendingen (DE); Roland Gehring, Elzach (DE); Richard Nopper, Gutach (DE); Uwe Schöpflin, Niederwinden (DE); Reinhard Heizmann, Glottertal (DE)

(73) Assignee: Sick AG, Waldkirch (DE)

( * ) Notice: Subject to any disclaimer, the term of this patent is extended or adjusted under 35 U.S.C. 154(b) by 224 days.

(21) Appl. No.: 12/285,528

(22) Filed: Oct. 8, 2008

(65) Prior Publication Data

US 2009/0095600 A1 Apr. 16, 2009

(30) Foreign Application Priority Data

Oct. 10, 2007 (DE) .................. 10 2007 048 679

(51) Int. Cl.
*B65G 43/00* (2006.01)
*G06K 7/10* (2006.01)
*G06K 9/00* (2006.01)
*H04N 1/047* (2006.01)

(52) U.S. Cl. ............. 198/810.01; 198/502.1; 198/502.4; 198/502.3

(58) Field of Classification Search ................ None
See application file for complete search history.

(56) References Cited

U.S. PATENT DOCUMENTS

| | | | |
|---|---|---|---|
| 3,701,098 A * | 10/1972 | Acker | 382/295 |
| 5,115,121 A | 5/1992 | Bianco et al. | |
| 5,308,960 A | 5/1994 | Smith et al. | |
| 5,448,078 A | 9/1995 | Nakazawa | |
| 5,923,017 A | 7/1999 | Bjorner et al. | |
| 5,982,483 A * | 11/1999 | Lauinger et al. | 356/239.2 |
| 5,991,470 A | 11/1999 | Swithers et al. | |
| 6,032,536 A * | 3/2000 | Peeters et al. | 73/725 |
| 6,061,645 A | 5/2000 | Bengala et al. | |
| 6,749,110 B2 * | 6/2004 | Hecht | 235/462.22 |
| 7,161,688 B1 | 1/2007 | Bonner et al. | |
| 2002/0014533 A1 | 2/2002 | Zhu et al. | |

(Continued)

FOREIGN PATENT DOCUMENTS

EP 0 204 516 A2 12/1986

(Continued)

OTHER PUBLICATIONS

Notice of Opposition filed with the EPO on Nov. 10, 2010, for European Patent No. 2 026 249, nineteen (19) pages.

(Continued)

*Primary Examiner* — Kavel Singh

(74) *Attorney, Agent, or Firm* — The Nath Law Group; Jerald L. Meyer; Robert T. Burns

(57) ABSTRACT

An apparatus, in particular a code reader, for the recording of images of objects (14) moved on a conveyor device (12), wherein the apparatus includes a line sensor (10), in particular a line camera, which can scan objects line wise for the generation of image data of the surfaces, as well as a speed determination device (26; 30), which can determine the speed of movement of the objects (14) with respect to the line sensor (10) or their conveyed distance. At the same time an evaluation unit (26) is provided, which is adapted to match the recording frequency of the line sensor (10) to the speed of movement.

19 Claims, 3 Drawing Sheets

U.S. PATENT DOCUMENTS

Figure 1:
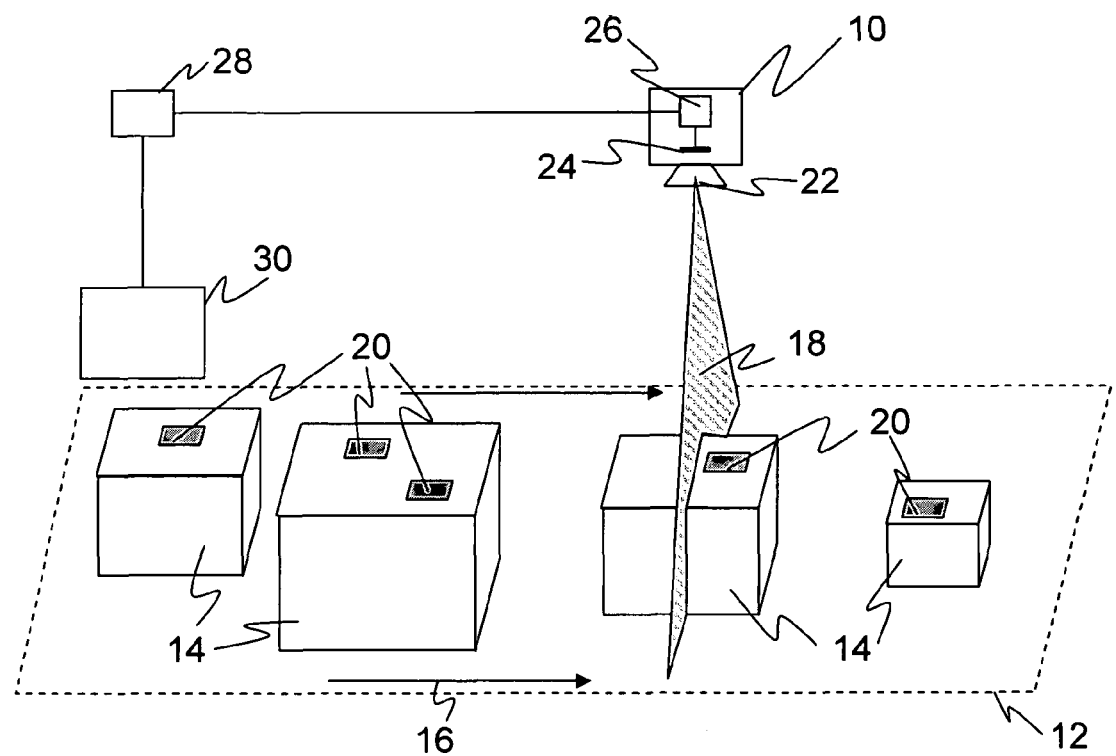

| | | |
|---|---|---|
| 2003/0053513 A1 | 3/2003 | Vatan et al. |
| 2003/0156303 A1 | 8/2003 | Schnee et al. |
| 2003/0206305 A1* | 11/2003 | Gagliano .................. 356/601 |
| 2006/0076415 A1 | 4/2006 | Reichenbach et al. |
| 2007/0090191 A1 | 4/2007 | Schnee et al. |
| 2007/0268530 A1 | 11/2007 | Gagliano et al. |
| 2009/0039157 A1 | 2/2009 | Reichenbach et al. |

FOREIGN PATENT DOCUMENTS

| | | |
|---|---|---|
| EP | 0 833 270 A2 | 4/1998 |
| EP | 0 851 376 A1 | 7/1998 |
| EP | 1 777 487 A2 | 4/2007 |
| WO | 00/27549 A1 | 5/2000 |
| WO | 02/43195 A2 | 5/2002 |
| WO | 02/092246 A1 | 11/2002 |
| WO | 03/044586 A1 | 5/2003 |
| WO | 2008/078129 A1 | 7/2008 |

OTHER PUBLICATIONS

Office Action, Non-Final Rejection, U.S. Appl. No. 12/222,285, mailed on Dec. 7, 2010, thirteen (13) pages.
Office Action, Final Rejection, U.S. Appl. No. 12/222,285, mailed on Jun. 16, 2011, nineteen (19) pages.
DataLogic S.p.A., "Installation Manual of the DV9500 camera," ed. Oct. 2004, ninety (90) pages.
DataLogic S.p.A., "Installation Manual of the DD9500 decoder (extract)," ed. Oct. 2004, six (6) pages.
DataLogic S.p.A., "Installation Manual of the DC9500 controller," ed. Oct. 2004, seventy-six (76) pages.
DataLogic S.p.A., "Partial Circuit diagram of the DV9500 camera," ed. Oct. 2004, five (5) pages.
Sorter Control to Camera Interface Description of the Torsvik Installation, Beumer-Specification BSC<—>CCD Camera DV 9000, Torsvik Sorting Center, three (3) pages. (Draft reportedly issued Jan. 18, 2002).
Invoice for Torsvik Delivery (in Sweden) dated Sep. 30, 2005, four (4) pages.
Filing of a new opposition filed with the EPO for European Patent No. 2048596 filed on Aug. 24, 2011, twenty-seven (27) pages.
Communication of a notice of opposition-first information to patent proprietor for European Patent No. 2048596 dated Sep. 2, 2011, one (1) page.
Notice of further opposition to opponents for European Patent No. 2048596 dated Sep. 30, 2011, one (1) page.
Communication of a notice of opposition and request to file observations for European Patent No. 2048596 dated Sep. 30, 2011, one (1) page.
Letter regarding the declaration for C. Saporetti, the opposition for European Patent No. 2048596, dated Nov. 14, 2011, two (2) pages.
Annexes to the letter of Nov. 14, 2011 for European Patent No. 2048596, dated Nov. 3, 2011, four (4) pages.
Brief communications-opposition proceedings for European Patent No. 2048596, dated Nov. 23, 2011, one (1) page.
Reply of Patent Proprietor to Notice(s) of Opposition for European Patent No. 2048596, dated Dec. 16, 2011, ten (10) pages.
English language translation prepared Mar. 2, 2012 of the Reply of Patent Proprietor to Notice(s) of Opposition for European Patent No. 2048596, dated Dec. 16, 2011, nine (9) pages.
Brief communication—Opposition proceeding for European Patent No. 2048596, dated Jan. 6, 2012, one (1) page.
Office Action, Non-Final Rejection, U.S. Appl. No. 12/222,285 mailed on Mar. 23, 2012, seventeen (17) pages.
General inquiry for European Patent No. 2026249, dated Jan. 14, 2011, one (1) page.
Brief communication-Opposition proceedings for European Patent No. 2026249, dated Jan. 31, 2011, one (1) page.
Reply of the patent proprietor to the notice(s) of opposition for for European Patent No. 2026249, dated Apr. 4, 2011, seven (7) pages.
English language translation of the Reply of Patent Proprietor to Notice(s) of Opposition for European Patent No. 2026249, dated Apr. 4, 2011, seven (7) pages.
Brief communication—Opposition proceedings for European Patent No. 2026249, dated Apr. 14, 2011, one (1) page.

\* cited by examiner

APPARATUS AND METHOD FOR THE RECORDING OF IMAGES OF OBJECTS MOVED ON A CONVEYOR DEVICE

The claimed subject matter relates to an apparatus for the recording of images of objects moved on a conveyor device in accordance with the exemplary embodiments disclosed herein.

For the automation of logistic applications, for example the automated sorting of objects, objects are provided with a code which are read out by a code reader. Barcodes with corresponding barcode scanners represent a common practical application. For the identification, however, different types of coding are used, for instance, two dimensional codes such as a maxicode or an Aztec code, or labels which are decoded using optical character recognition (OCR). To read such codes, images of the objects are recorded with the codes.

In a reading device working in an automated manner, for instance in a baggage handling in airports or the automated sorting of parcels in logistic centers the objects are conveyed past the code reader and image data of the objects, which have the codes arranged on them, are obtained by a line wise scanning.

The conveying device, on which the objects are moved, does not always move at a uniform speed. This is in particular the case with tray sorters, where in each case each tray of the conveyor device only receives one object. On the loading of such a tray sorter objects are transported to the trays via so called infeed belts. If at that moment no tray is free, the infeed belt has to be slowed down or stopped. A code reader mounted above the infeed belt, which scans the object line wise, then only delivers distorted images, since the relative motion between the object and the code reader is irregular. This problem does not only occur at infeed belts, but on all changes in speed of the conveyor on which the objects are located. Distortions in the recorded image data, however, complicate the decoding, in particular when conventional text recognition programs are meant to evaluate the images to decode text such as an address.

It is thus the object of the invention to further develop a bar code scanner which obtains image data line wise such that it delivers distortion free images or less distorted images.

This object is satisfied by an apparatus and by a method for the recording of images in accordance with the exemplary embodiments disclosed herein. Since the recording frequency of the line sensors is adapted to the speed of movement, the resolution of the image data can remain independent of the movement profile. Subsequent image evaluations including decoding or text recognition can work with image data which are free of interference, distortion and other artifacts due to a different conveying speed. The evaluation is thereby simplified and, in particular, misreading is avoided and thus the rate of reading is increased so that a complex and a cost inflating manual further treatment of the automated sorting is required less often.

The invention is based on the principle of recognizing and reacting to interference in the uniform sequence of motion of the conveyor device. The density of the recorded image lines is then no longer dependent on the speed of the conveyor, but rather ultimately on the conveyed distance of the objects, which is the right measure for a distortion free and uniformly resolved image. For this reason the speed determination device can also be understood such that it indicates the covered distance without a direct time reference. Since a time reference is nevertheless established from the recording frequency, in this case a measure of speed is also ultimately used as the basis.

The evaluation unit is preferably designed to adaptively match the recording frequency in such a way, that the line sensor records image data of equidistant lines of the object. Here the reference is the object via its conveying speed—the image lines in this way are thus distributed equidistantly and uniformly over the object—and this signifies a uniform image resolution in the direction transverse to the lines, which corresponds to an image which was recorded in a virtual situation with a uniform conveying speed and constant recording frequency. The evaluation thus becomes independent of interferences due to fluctuations in the conveying speed.

In a preferred embodiment the line sensor is adapted to be set to a base recording frequency with associated recording parameters which in particular corresponds to a maximum conveying speed of the conveyor device and the evaluation unit is adapted to differentially set the adaptation of the recording frequency and/or of the recording parameters for the line sensor to a speed of movement changed with respect to the maximum conveying speed. Such recording parameters can be the brightness, amplification factors, exposure times or similar. The system is therefore set to a basic setting which corresponds to the usual interference free state of the conveyor. In accordance with the invention it is not necessary to interfere with this basic setting. Only when a conveying speed differing from the basic setting is detected, is an adaptation of the frequency carried out and if necessary an or every frequency dependent recording parameter is modified, for instance the exposure time is shortened, to satisfy the requirements of a higher recording frequency and the corresponding amplification is increased accordingly.

In an advantageous embodiment the speed determination device is a displacement sensor, an incremental encoder or a different sensor preceding the line sensor. Such a sensor is often anyway integrated into the conveyor to know the speed for any reasons related independent to the code reading. If the line sensor knows the speed on time, then the adaptation of the recording frequency can be planned and executed in advance. A displacement sensor indicates how big the conveyed distance of the object is since the last recording. This information can be used to determine when the next line should be recorded and is thus a measure for the suitable recording frequency.

Alternatively the speed determination device is a conveyor controller of the conveyor device which in particular sets the speed profile of the conveyor device and the conveyor controller can send data on the speed profile to the evaluation unit which in particular include a current speed, a duration of a subsequent acceleration phase, a start of the acceleration phase and/or an end speed after the completion of the acceleration phase. Here and in the following acceleration is to be understood in the physical sense, i.e. it includes a deceleration or braking at negative acceleration. Furthermore, an acceleration phase at a constant acceleration with a starting speed, an end speed, a start and a duration of the acceleration phase is over-determined, it is therefore sufficient to transfer only some of these parameters. If data of a phase of non uniform motion of the conveyor is transferred directly from the conveyor controller then, on the one hand, an actual measurement of the speed can be omitted and, on the other hand, data on the change of speed are already provided far in advance. In particular, with tray sorters it is usual to carry out braking and accelerations not in an arbitrary way, but, in each case, with an exactly determined acceleration phase. This procedure is conceivable for every conveyor. A practically relevant example for such a predetermined acceleration phase is when the conveyor controller is advantageously adapted for the setting of a maximum conveying speed of 2 m/s, of a lowered conveying speed of 0.5 m/s as well as of an acceleration phase of 500 ms at an acceleration of 3 m/s² from the maximum conveying speed to a lowered speed and vice versa. This set of parameters is, in particular, used for current tray sorters and their infeed belts.

The conveyor device is preferentially a tray conveyor or its infeed belt. With a tray conveyor the problem of an already occupied tray and thus of a required adaptation of speed can easily arise. For this reason the invention is particularly suitable for tray conveyors, since it can balance out distortions in the image data which arise due to the regularly occurring acceleration phases.

In a particularly advantageous embodiment the recording frequency changes over time for a set speed profile of an object is stored in a table in the evaluation unit as time intervals between two respective recordings, with the entries into the table in particular describing a hyperbola. The apparatus can in this way be prepared in advance for certain changes in speed of the conveyor. For this purpose, the table can, in a preliminary phase, but also online, be input during a start up phase or a maintenance break, or be read in via an interface or a network connection. The hyperbola as stored in the table as a table of values is therefore particularly advantageous, since due to the inversely proportional relationship between the recording frequency and period, i.e. the time between two recordings, and the proportional relationship between the recording frequency and the conveying speed for the recording of a uniformly resolved image said hyperbola is particularly the suitable function for the treatment of a phase with uniform acceleration.

Even more preferably the evaluation unit is adapted so that entries of the table are set, in particular by inputting or reading in, or are calculated on the basis of a set speed profile, in particular as hyperbolas of a maximum conveying speed, of a lowered conveying speed as well as of a uniform acceleration phase therebetween, which is specified by a start time, a finish time and/or an acceleration. The invention can thus autonomously generate the table from data describing the acceleration phase and simplify the implementation.

The evaluation unit is preferably adapted to use a table value a plurality of times to reflect longer acceleration phases and/or to initiate a recording stop of the line sensor if the speed of movement is zero, i.e. the conveyor device is stopped. In accordance with the first aspect, to save memory requirements and computing effort, the table can be resolved in less detail in that each value is used a plurality of times. In accordance with the second aspect the apparatus is able to react appropriately to a belt stop in which further recordings of image data cannot deliver any useful information. On restarting the belt a smooth transition can be ensured, since this is nothing other than an acceleration phase with a start speed of zero, which in accordance with the invention can be compensated like any other acceleration phase.

In a further preferred embodiment a further table is provided in the evaluation unit, which includes time intervals for the recording frequency for the case that the sign changes in an acceleration phase, i.e. a reversal of the acceleration occurs, to ensure a smooth transition of the time intervals. Without such an additional table the recording frequency plotted against time would show a kink, which would be reflected in the image data as interfering distortion.

Advantageously, the evaluation unit is at least partly implemented on a programmable logic component, in particular an FPGA, of the line sensor, with the line sensor including at least one input with which the logic component can be instructed to start and execute the adaptation of the recording frequency via a set speed profile. The invention is thus implemented in essentially encapsulated form on a separate component, which through a simple start command can be caused to compensate interfering effects by changes of speed of the conveyor. This enables a simple, cost effective and modular integration of the solution in accordance with the invention into existing reading systems. Instead of an additional logic component, an already existing logic component can naturally be provided with the functionality in accordance with the invention.

The method in accordance with the claimed subject matter can be further developed in a similar way and shows similar advantages. Such advantageous features are described in exemplary manner but not exclusively in the exemplary embodiments disclosed herein.

Figure 2:
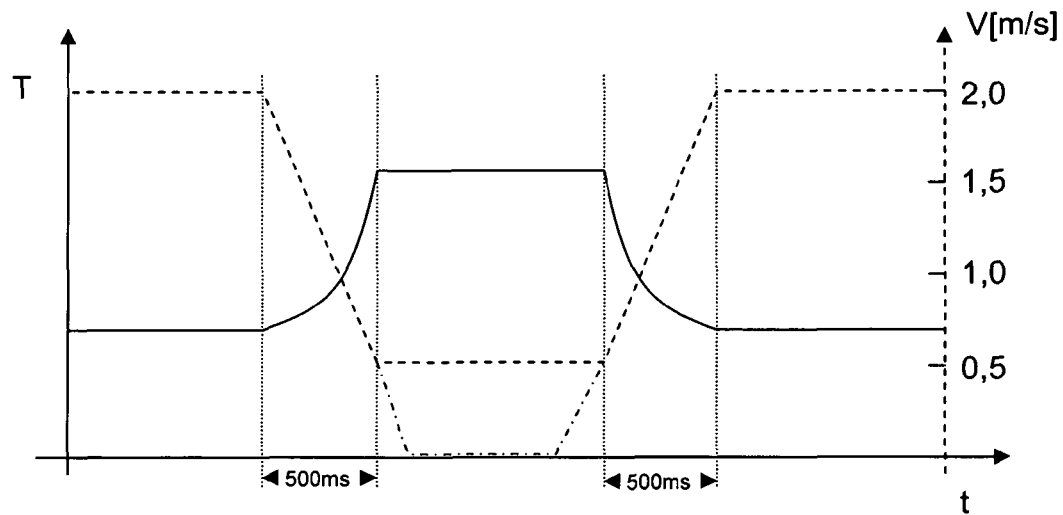
Figure 3:
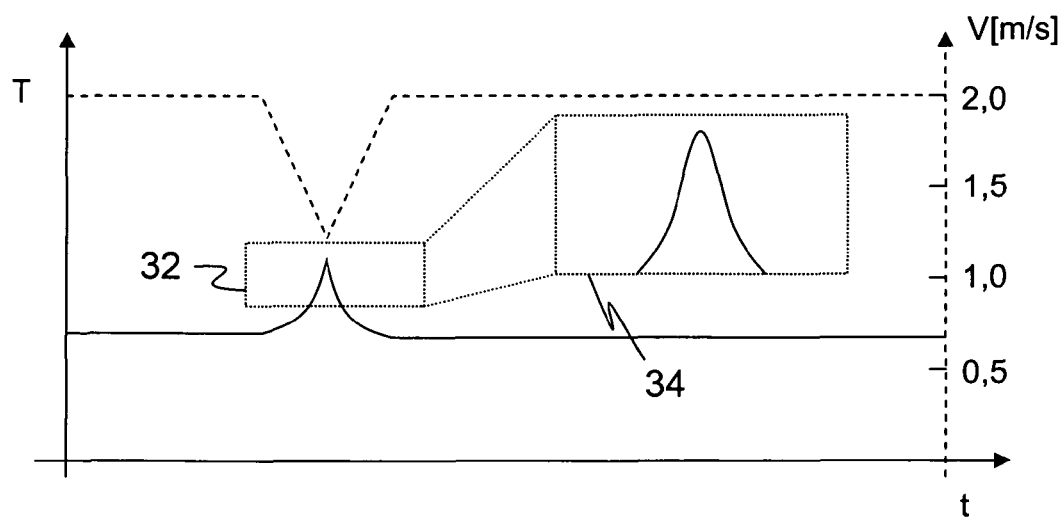
Figure 4:
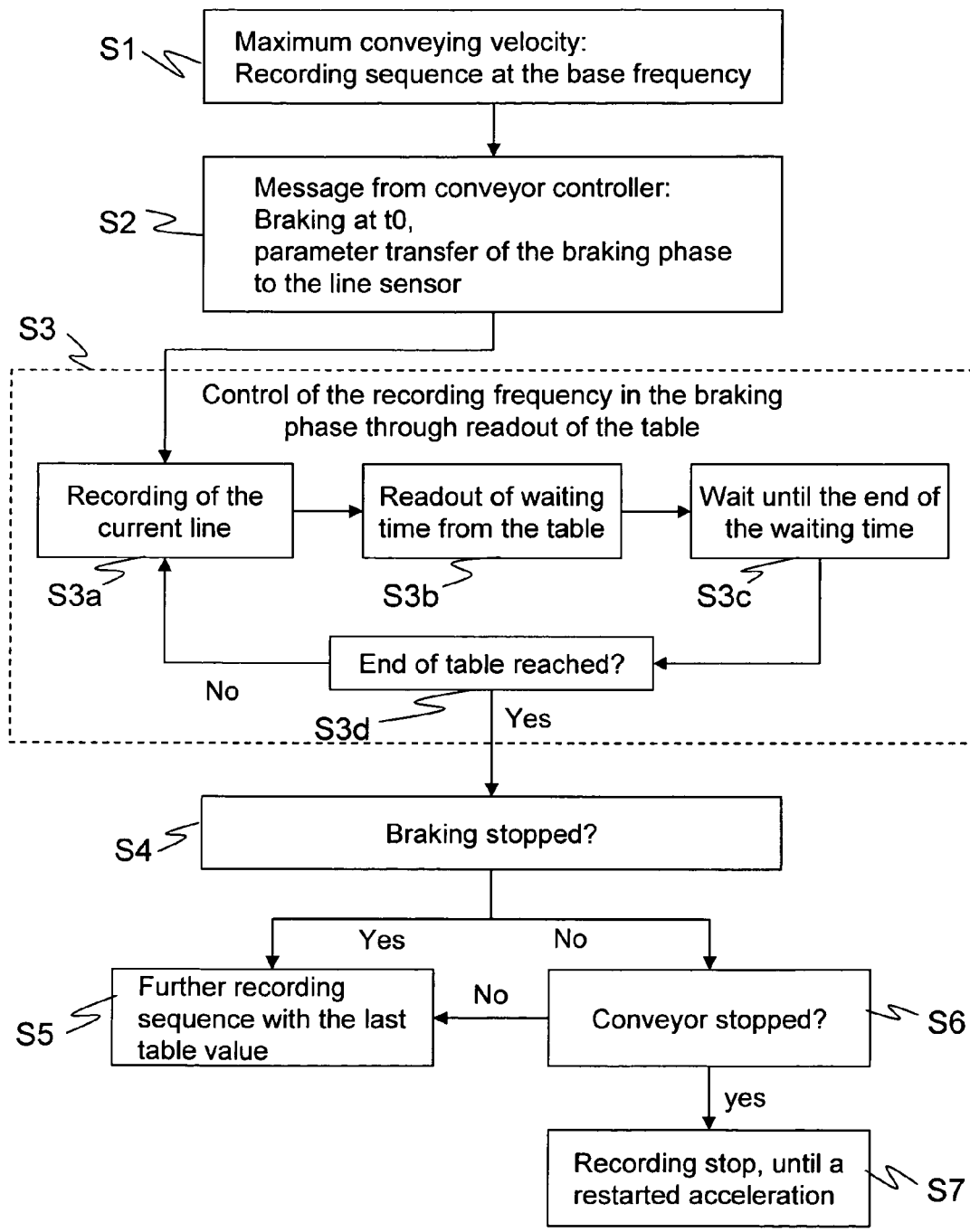

The invention will be explained in the following, with respect to further features and advantages by way of example with reference to advantageous embodiments and to the enclosed drawings. The Figures of the drawings show:

FIG. 1 a schematic three dimensional representation of an embodiment of the apparatus in accordance with the invention above a conveyor belt with a plurality of objects moved on it;

FIG. 2 a representation of the time dependent recording period, that is the inverse recording frequency and the conveying speed in a braking and acceleration phase;

FIG. 3 a representation in accordance with FIG. 2 in a special situation that the conveyor is again accelerated during a braking phase; and FIG. 4 a flow chart of the adaptation of the recording frequency to the conveyed speed in accordance with the invention using the example of a braking phase with constant acceleration.

FIG. 1 shows in a schematic three dimensional representation the arrangement of an embodiment of a line sensor 10 in accordance with the invention above a conveyor belt 12, on which objects 14 are moved past the sensor 10 in a direction, indicated by the arrows 16. The objects 14 carry information 20, which is detected and read out by the line sensor 10.

The line sensor 10 includes an objective 22 only shown by way of indication with an optical imaging system and a line sensor 24, for example a CMOS or a CCD line. The line sensor 24 delivers image data of the objects 14 in a reading plane 18. The image data detected line wise through the reading plane 18 on the continuous movement of the objects 14 are composed to a total image to enable a image evaluation. The possible image analyses the decoding of information 20, for example, bar codes, two dimensional codes or text recognition by the controller 26 or in a subsequent system not illustrated in FIG. 1. Alternatively to a line camera with a linear image sensor 24 also another technical implementation can also be provided as a line sensor 10, for instance scanning of the line or any other known optoelectronic methods.

A message node 28 is connected to the controller 26, for instance as a part of a data network or as a bus system, which receives data on the conveyor belt 12 from a conveyor controller 30 and passes these on to the control 26. The conveyor controller 30 is among other things responsible to control the movement of the conveyor belt 12, that is to accelerate it, to brake it, to start it, to stop it or to maintain it at a preset conveying speed. Alternatively to a connection of the control 26 to the conveyor controller 30, provision can also be made to measure the speed or the position of the conveyor belt 12 with a separate sensor, which precedes the line sensor 10 or is integrated into this if, for instance an incremental encoder, a displacement sensor, or also a preceding optoelectronic sensor.

In a specific embodiment of the invention the conveyor belt 12 is operated in normal operation at a constant maximum speed of 2 m/s. The conveyor controller 30 is able to reduce the speed to 0.5 m/s and to subsequently bring it back to the maximum speed. The change of speed occurs in a deceleration phase or an acceleration phase of 500 ms at a constant acceleration of ±3 m/s$^2$. This is in particular necessary when the conveyor belt 12 is an infeed belt of a tray sorter which has to be slowed down, if no tray is free at that moment. The invention is, however, not restricted to this specific speed profile of the conveyor 12, but is able to generate non distorted image data for arbitrary constant and non constant speeds in that the recording frequency of the line sensor 10 is adapted to the current speed and, associated with this, to the distance the object 14 has covered between two recordings of the line sensor 10.

The adaptation of the recording frequency should now be explained on the basis of the speed profile, as is illustrated in FIG. 2. Instead of the recording frequency the actually relevant value is its reciprocal value, that is the recording period or the time which elapses between two recordings of the line sensor 10. This can be directly handled by the controller 26 in that following a recording the end of respectively required recording period is waited for. Thus in FIG. 2, besides the speed profiles illustrated with dashed lines, a solid line representing the reciprocal value instead of the recording frequency, namely the recording period T is shown.

If one follows the speed profile (dashed line) and the corresponding recording period (solid line) over time in FIG. 2, then the conveyor belt 12 initially moves at a maximum speed of 2 m/s, while the line sensor 10 scans the conveyed objects 14 at a base recording frequency shown in arbitrary units. At a point in time shown by a first dotted perpendicular line the conveyor belt is braked at a constant acceleration of 3 m/s$^2$ within 500 ms to a lower speed of 0.5 m/s. So that in this braking phase image data of the objects 14 are also uniform, i.e. the image lines are equidistantly distributed over the objects 14, the recording period increases as a hyperbola during the braking phase. While the conveyor belt subsequently moves at the lowered speed of 0.5 m/s, the line sensor 10 records image data with an increased constant recording frequency per line. At a later point in time the conveyor belt 12 is reaccelerated uniformly to its original maximum speed of 2 m/s (third and fourth dotted perpendicular lines), with in the acceleration phase the recording period being shortened in the manner of a hyperbola analogous to the braking phase.

In this way a disadvantageous effect of the non constant speed of the conveyor 12 is compensated by a corresponding adaptation of the recording period or the recording frequency and the image data put together by the controller 26 to an image are distortion free, i.e. they do not allow any difference to a virtual situation to be recognized, in which the conveyor belt 12 is moved at a uniform speed without any acceleration phases.

A special situation occurs when the conveyor is slowed down below the reduced speed and becomes completely stationary, as indicated by the chain dotted line. In this situation the recording period has to be adjusted via a correspondingly extended hyperbola and set to infinity while the belt is stopped, this means that one waits for so long until the conveyor 12 moves again. The restarting of the conveyor 12 represents an acceleration phase, during which the recording frequency can be adapted, as displayed, to provide a distortion free image.

To implement the adaptation of the recording frequency in a technically simple manner the recording parameters of the line sensor 10 such as the brightness or the exposure time and also its recording frequency are set to a basic setting which corresponds to the maximum speed of the conveyor 12. If the speed changes, then the recording frequency is adapted in that the recording period of the basic setting is differentially provided with a portion which corresponds to the adaptation. In a corresponding way the recording parameters are adapted to the changed recording period. The underlying maximum speed can be preset or be adaptively determined during operation. For this determination the speed data can be determined by the controller 26 itself or it can be transferred via the message node 28 from the conveyor controller 30.

FIG. 3 is a representation analog to FIG. 2, to illustrate a particular situation in which acceleration again takes place during the braking. The dashed section of the recording period which is plotted over time shows a kink at that point where the sign of the acceleration changes. This kink would lead to a distortion of the image data. Since the line sensor 10 is informed of the kink in advance by the conveyor controller 30, a smoothing of the recording period can be carried out and thus the distortion can be avoided, as shown in the enlarged section 34.

With reference to FIG. 4, a method for the adaptation of the recording frequency is illustrated, in the following, which is based on a table in which values for suitable recording periods for a preset speed profile are stored. For a constant acceleration the table is a table of values for a hyperbola; for other speed profiles the table has to be calculated from the reciprocal value relationship between the recording frequency and the recording period and the relationship between the speed of the conveyor 12 and the recording frequency, which is proportional for a wanted uniform resolution of the image data. Such a calculation can be done in advance and the table can be stored in a non-volatile memory; the control 26 can, however, also be able to independently calculate the table from a speed profile. Further configuration methods consist in an input or a reading in of the value table via a network connection or a user interface.

The line sensor 10 works at a base frequency in a first step S1 in a phase in which the conveyor 12 is moving at a maximum conveying speed. In a second step S2 the line sensor 10 receives a message from the conveyor controller 30 in which a changed speed profile from a predetermined time t0 onward is announced. In the example shown it is a braking phase whose parameters are transferred from the conveyor controller 30 to the controller 26 of the line sensor 10. In a third step S3, which consists of a loop to be subdivided into sub steps S3a to S3d, the table with the recording periods associated with the speed profile is worked through from the point in time t0 onward, until the braking phase is over.

For this purpose for each iteration through the loop a line (S3a) is recorded, the next recording period or waiting time is read from the table (S3b), the corresponding time is waited (S3c) for and a check is made whether the end of table is reached (S3d). If the end of table has not yet been reached, then the loop restarts with a recording of the next line (S3a).

On reaching the end of table, the loop is quit and a check is made in a further step whether the braking phase has stopped in accordance with the parameters transferred in the step S2, or, whether the speed according to the current measurement is constant again. If this is the case, then further image data are generated line wise in a recording period which corresponds to the last table value and thus to a recording period appropriate for the end speed. If, in contrast, the braking phase had not stopped in S4, then a check is made (S6) whether the conveyor 12 was stopped. If this is the case, then further recordings are stopped, until the conveyor 12 is restarted in a new acceleration phase. Otherwise the braking phase has still not stopped, although no more values are provided in the table. Then the recording period is continued as in step S5 with the last table value because this is admittedly possibly not the ideal value, but it is anyway the best available value.

The described run through an acceleration phase can be a braking phase a real acceleration phase with a positive acceleration or a mixture of both with a single or a plurality of changes of movement. The method is the same in each case because the required recording periods are available in the table. This also applies to the special case of an acceleration from a stationary conveyor 12, which in the view of the method in accordance with the invention does not request any special feature.

The implementation via a table of values is only a particularly simple realization the claimed subject matter, and is not restricted to this. Thus, for example, it is conceivable that the speed or the distances respectively covered by the conveyor 12 are determined dynamically by the line sensor 10 or by a preceding sensor and the next recording period is calculated therefrom online or with a time delay.

In a particular embodiment of the invention either the controller 26 as a whole or only the part which realizes the method in accordance with the invention in particular in accordance with FIG. 4 including the value table, is implemented on a separate logic component, for example, an FPGA. It is then sufficient to advise the logic component which speed profile is preset and this then returns the matching recording periods in a time dependent sequence. For this purpose specifically a whole series of tables can be stored in the FPGA which correspond to different speed profiles, braking phases or acceleration phases. The invention can then be easily integrated into existing systems in that instead of a constant waiting time between two recordings the FPGA caused by a simple switch command to output the adapted recording periods, which are used as the waiting time.

The invention claimed is:

1. An apparatus for the recording of images of objects moved on a conveyor device, comprising:
 a line sensor configured to scan objects line wise in a transverse direction to movement of the conveying device for the generation of image data of surfaces;
 a speed determination device, configured to determine a speed of movement of the objects with respect to the line sensor; and
 an evaluation unit configured to vary the recording frequency of the line sensor with the speed of movement,
 wherein the speed determination device is a conveyor controller of the conveyor device, which is configured to set the speed profile of the conveyor device, and
 wherein the conveyor controller is configured to send data on the speed profile to the evaluation unit, wherein the data is selected from the group consisting of a current speed, a duration of a subsequent acceleration phase, a start of the acceleration phase, and/or an end speed after the completion of the acceleration phase.

2. An apparatus in accordance with claim 1, wherein the evaluation unit is configured to vary the recording frequency such that the line sensor records image data of equidistant lines of the object.

3. An apparatus in accordance with claim 1,
 wherein the line sensor is configured to be set to a base recording frequency with associated recording parameters corresponding to a maximum conveying speed of the conveyor device; and
 wherein the evaluation unit is configured to differentially set the adaptation of the recording frequency and/or of the recording parameters for the line sensor to a speed of movement varied with respect to the maximum conveying speed.

4. An apparatus in accordance with claim 1, wherein the speed determination device is selected from the group consisting of a displacement sensor, an incremental encoder, and a different sensor preceding the line sensor.

5. An apparatus in accordance with claim 1, wherein the conveyor controller is configured for a setting of a maximum conveying speed of 2 m/s, a lowered conveying speed of 0.5 m/s, and an acceleration phase of 500 ms at an acceleration of 3 m/s$^2$ from the maximum conveying speed to a lowered speed and vice versa.

6. An apparatus in accordance with claim 1, wherein the conveyor device is a tray conveyor or its infeed belt.

7. An apparatus in accordance with claim 1,
 wherein the recording frequency varying over time for a set speed profile of an object is stored in a table within the evaluation unit as time intervals between two respective recordings, and
 wherein the entries into the table describe a hyperbola.

8. An apparatus in accordance with claim 7, wherein
 the evaluation unit is configured so that entries of the table are set or calculated on the basis of the set speed profile.

9. An apparatus in accordance with claim 8, wherein the entries of the table include one or more hyperbolas describing one or more of a maximum conveying speed, a lowered conveying speed, and a uniform acceleration phase therebetween specified by a start time, a finish time and/or an acceleration.

10. An apparatus in accordance with claim 7, wherein the evaluation unit is configured to use a table value for a plurality of times, to reflect longer acceleration phases and/or to initiate a recording stop of the line sensor when the speed of movement is zero.

11. An apparatus in accordance with claim 7, wherein a further table is provided in the evaluation unit which includes time intervals for the recording frequency when a reversal of acceleration occurs.

12. An apparatus in accordance with claim 1,
 wherein the evaluation unit is at least partially implemented on a programmable logic component and
 wherein the line sensor includes at least one input, and
 wherein the logic component is configured to be instructed to start and execute the adaptation of the recording frequency via a set speed profile.

13. An apparatus in accordance with claim 1, wherein the line sensor is a camera.

14. An apparatus in accordance with claim 1, wherein the programmable logic component is an FPGA.

15. A method for recording images of objects moved on a conveyor device and decoding codes arranged on the objects, comprising the steps of:
 generating image data by scanning objects line wise in a transverse direction to movement of the conveying device;
 determining a speed of movement of the objects with respect to the line sensor;
 varying a recording frequency of the line wise scanning with the speed of movement;
 setting a speed profile for the conveyor device, the speed profile including a current speed, a duration of a subsequent acceleration phase, a start of the acceleration phase and/or an end speed after the completion of the acceleration phase; and
 using the speed profile to vary the recording frequency.

16. A method in accordance with claim 15, further including the steps of:

using a table value a plurality of times to reproduce longer acceleration phases and/or;

initiating a recording stop when the speed of movement is zero; and/or providing a further table which includes time intervals for the recording frequency when a reversal of the acceleration occurs.

17. A method in accordance with claim 15, wherein scanning lines are distributed equidistantly over the objects.

18. The method of claim 15, further comprising the step of setting a maximum conveying speed of 2 m/s, a lowered conveying speed of 0.5 m/s, and an acceleration phase of 500 ms at an acceleration of 3 m/s$^2$ from the maximum conveying speed to a lowered speed and vice versa.

19. A method for recording images of objects moved on a conveyor device and decoding codes arranged on the objects, comprising the steps of:

generating image data by scanning objects line wise in a transverse direction to movement of the conveying device;

determining a speed of movement of the objects with respect to the line sensor;

varying a recording frequency of the line wise scanning with the speed of movement;

setting a speed profile for the conveyor device, the speed profile including a current speed, a duration of a subsequent acceleration phase, a start of the acceleration phase and/or an end speed after the completion of the acceleration phase;

using the speed profile to vary the recording frequency;

varying the recording frequency over time for a set speed profile of an objects and storing the change in a table as time intervals between two respective recordings, wherein the entries in the table describe a hyperbola calculated from at least one of the group consisting of a maximum conveying speed, a lowered conveying speed, and a uniform acceleration phase therebetween specified by a start time, a finish time and/or an acceleration.

* * * * *